July 9, 1957  H. B. RANDOLPH ET AL  2,798,562
DEVICE FOR PROTECTING A FUEL TANK AGAINST EXPLOSION
Filed April 20, 1953  4 Sheets-Sheet 1

INVENTORS:
A. MATHISEN &
H. B. RANDOLPH
By Ben. J. Chinny
THEIR ATTORNEY

INVENTORS:
A. MATHISEN &
H. B. RANDOLPH
BY
THEIR ATTORNEY

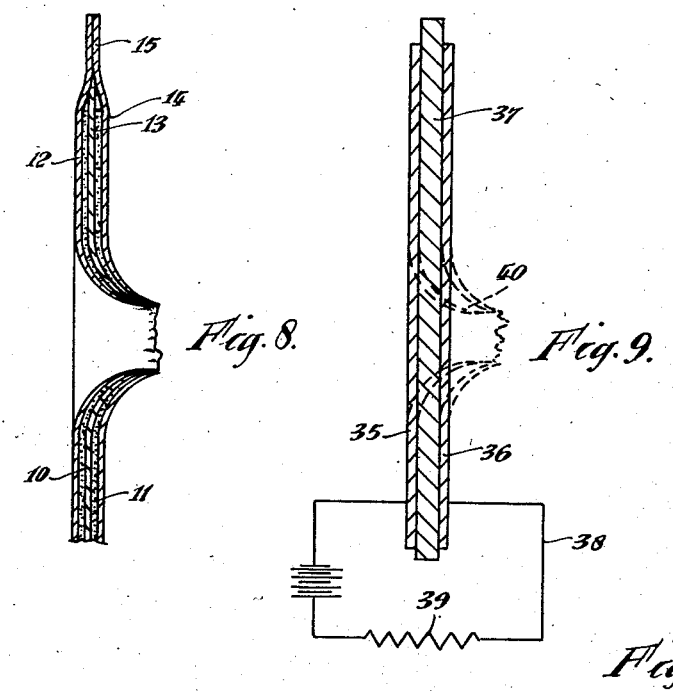
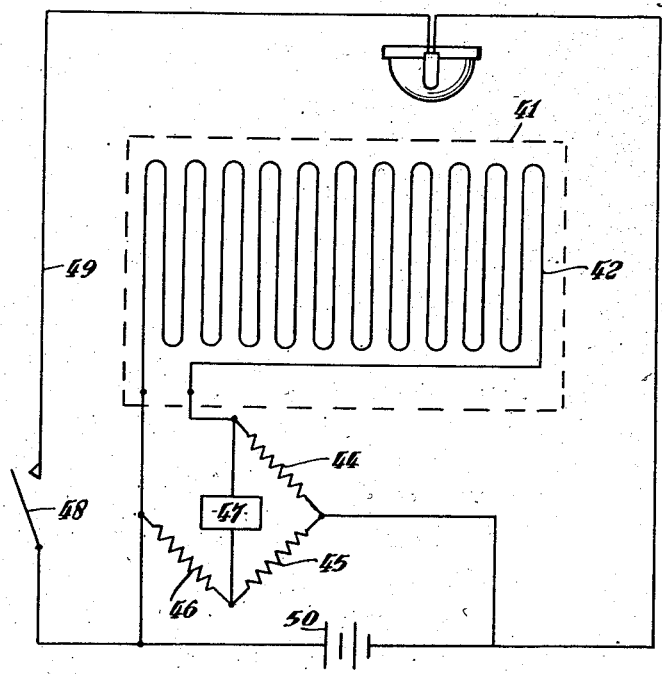

United States Patent Office 2,798,562
Patented July 9, 1957

2,798,562

DEVICE FOR PROTECTING A FUEL TANK AGAINST EXPLOSION

Harry Beckham Randolph and Anders Mathisen, London, England, assignors of one-half to Graviner Manufacturing Company Limited, and one-half to The Wilkinson Sword Company Limited, both of London, England, both British companies Application April 20, 1953, Serial No. 349,852

Claims priority, application Great Britain April 21, 1952

8 Claims. (Cl. 169—4)

This invention relates to a method of and means for detecting damage to the wall of a space enclosing structure.

The primary object of the invention is to provide a method of and means for detecting damage to a wall of a space enclosing structure such as would be produced by the passage therethrough of a projectile such as a bullet, shell, splinter or the like.

A further specific object of the invention is to provide means operated by the detecting means for releasing fire extinguishing and/or explosion suppressing substance within the space enclosed by the wall in order to prevent or extinguish any outbreak of fire or to prevent or suppress an explosion in the said space which may result from the passage of the projectile therethrough.

With the foregoing object in view, the method according to the invention of detecting damage to the wall of a space enclosing structure by a bullet or like projectile or missile consists in providing an electric circuit which is normally open but which is adapted to be closed automatically following the passage of a bullet or like projectile through said wall to effect a desired operation.

The passage of the projectile may be detected by electronic means.

One method according to the invention consists in providing on the said wall a detector comprising two conductors electrically insulated from each other and from the wall, and connecting the two conductors to a current supply, the circuit of which is interrupted only by the insulation between the two conductors, whereby should the wall be pierced by a bullet or like projectile the two conductors may be short-circuited or locally deformed to short circuit around the bullet or like hole thereby closing the circuit to effect a desired operation.

Another method according to the invention consists in connecting in parallel with the normally open circuit a normally closed Wheatstone bridge circuit arranged so that when a bullet or like projectile passes through the wall the bridge is unbalanced and a current flows through the bridge to operate a relay to close the normally open circuit.

The method may further consist in providing containers for fire extinguishing and/or explosion suppressing substance or substances, these containers being operated to release the substance or substances referred to when the circuit is closed in order to prevent fire or explosion resulting from the passage of the bullet or the like through the enclosed space.

One form of detector device for carrying out the method according to the invention comprises two conductors electrically insulated from one another and from the wall referred to and connected respectively to the opposite poles of a current supply source, the thickness of the insulation between the conductors being such that the edges of the bullet or like hole made therein are drawn out in the direction of passage of the bullet, or the like, to make contact with each other and close the supply circuit to produce a required operation.

Another form of detector device for carrying out the method according to the invention comprises a Wheatstone bridge circuit, one of the arms of which comprises a continuous zig-zag resistance adapted to be laid over the wall to be protected, adjacent parts of the resistance being closely spaced together so that one or more parts must necessarily be severed by the passage of a bullet or other projectile through the wall on which it is laid, the normally open circuit being connected in parallel with the Wheatstone bridge and containing a relay operated when the zig-zag winding is severed to close the open circuit.

In other forms of detector device made according to the invention, and described in greater detail hereafter the bullet or like projectile passing through the wall of the space enclosing structure is itself used to close, for a small fraction of a second, the normally open circuit.

In a preferred embodiment the conductors comprise strips of metal gauze, and the conductors and the associated insulating strip or strips are in the form of a mat or wrapping arranged to be attached in any suitable way to the wall to be protected.

This mat or wrapping may comprise three strips of insulating material, namely, two outer strips and an intermediate strip, the two conductor strips being disposed respectively on opposite sides of the intermediate strip between the latter and the adjacent outer strip, or it may comprise a single insulating strip disposed between the two conductor strips.

One particular application of the invention is to protect fuel tanks, for example of air and sea craft and of land vehicles, from the danger of explosion and fire if they should be struck by a bullet or the like.

Detecting means according to the invention can also be used where there is little or no danger of fire. For example, the detector can be applied to the wall of a ship and be arranged to cooperate with a suitable indicating device so that if the ship is struck, for example by a torpedo, an immediate indication will be given at a suitable place in the ship of the approximate location of the strike.

In the accompanying drawings which illustrate how the invention may be carried into effect:

Fig. 8 illustrates how a detector according to the invention operates an electrical circuit;

Figure 9 illustrates a modified form of detector, and

Figures 10, 11 and 12 illustrate respectively other ways of carrying the invention into effect.

Figure 1:
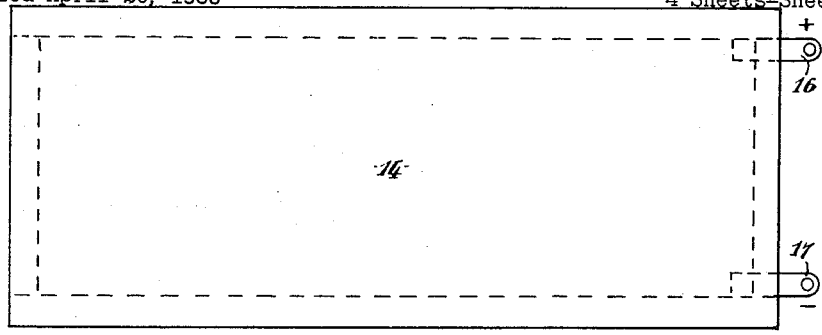
Figure 1 is a plan view of a detector comprising a wrapping or covering made in accordance with the invention.
Figure 2:
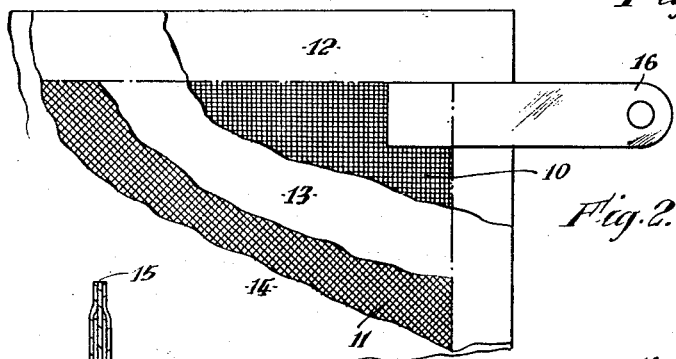
Figure 2 is a scrap view showing in detail one corner of the wrapping shown in Fig. 1.
Figure 3:
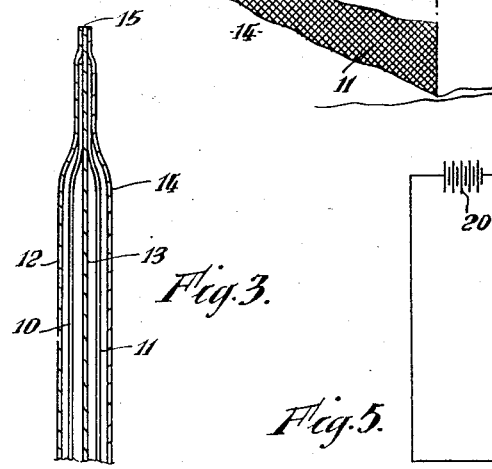
Figure 3 is a cross-sectional detail view of part of the wrapping shown in Figs. 1 and 2, before completion.

The wrapping shown in Figs. 1–3 comprises a multilayer structure consisting of two metal, preferably aluminium, gauzes 10, 11 of 50 mesh 40 S. W. G. interleaved between three sheets 12, 13, 14 of insulating material, consisting in the present example of kraft paper, the two outer sheets 12, 14 having a thickness of .006" and the central sheet 13 having a thickness of .002". The gauzes and insulating sheets are bonded together with an adhesive known under the trade name Araldite 101; the gauzes need only be spot fixed at intervals on the kraft paper. The outer edges of the paper sheets are glued together as shown at 15 (Fig. 3). The actual size of the wrapping shown in Figs. 1–3 is 3 feet by 18 inches. An electrical terminal tag 16 or 17 is welded or otherwise electrically connected to each gauze sheet 10, 11, and as shown in Fig. 2 the two gauze sheets are preferably so disposed that the wires of the gauze 11 are disposed at angles of 45° to the wires of the gauze 10.

The wrapping shown in Figs. 1–3 is intended as a "strike" detector, i. e. to detect strikes by bullets passing therethrough.

Figure 5:
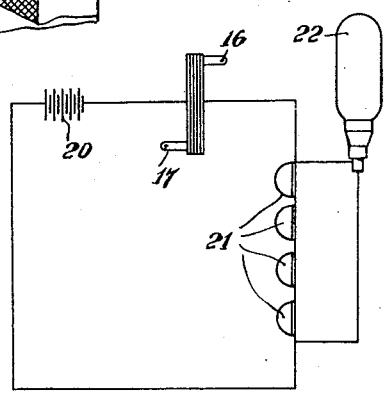
Figure 5 is a diagram of one form of electrical circuit.

Fig. 8 shows how a bullet passing through the wrapping will cause the gauzes to pull out in the direction of passage of the bullet and will cause the wires of the different gauzes to become swaged together. Thus, if the wrapping is included in an electrical circuit such as shown in Fig. 5 which is normally open by reason of the three insulating layers, the swaged wires of the gauzes will close the circuit and thus produce a desired operation. The circuit of Fig. 5 is supplied by a battery 20 and includes four containers 21 of fire extinguishing or explosion suppressing substance connected in series, and a bottle or flask 22 containing a fire extinguishing fluid which is connected in parallel. The containers 21 are fitted in a known manner with electrically operated detonators which operate when the circuit is closed in the manner above described to burst the containers, whereupon the substance contained therein is scattered; simultaneously the bottle 22 is opened and the fluid contained therein, which is under pressure, is discharged. The containers 21 and the bottle 22 will, of course, be suitably located in the area in which an explosion or fire is likely to occur.

Figure 4:
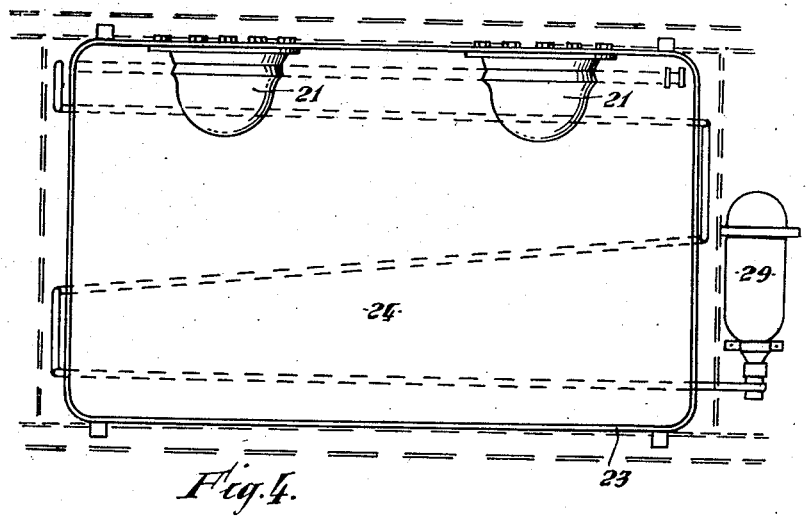
Figure 4 shows an aircraft fuel tank fitted with a wrapping or covering such as shown in Figs. 1–3, and with containers for fire extinguishing and explosion suppressing substance.
Figure 6:
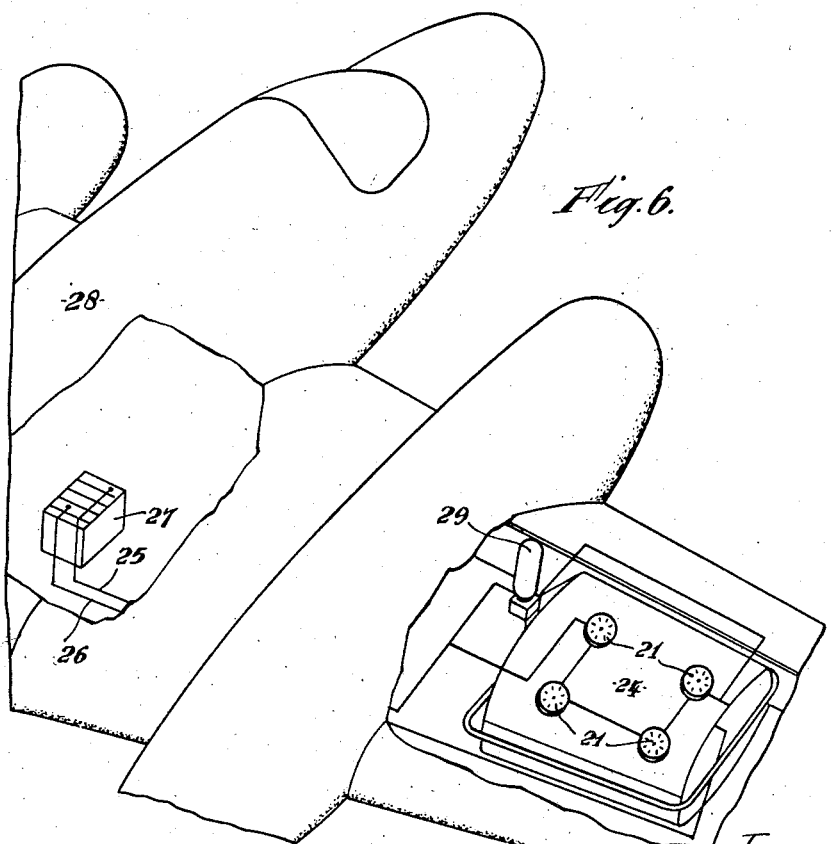
Figure 6 shows a fuel tank, such as shown in Fig. 4 mounted in an aircraft wing and electrical circuit connections for the purpose of the invention.

Figs. 4–6 illustrate the application of the invention to an aircraft fuel tank. In these figures a wrapping such as shown in Figs. 1–3 is wrapped round the top and bottom and the leading and trailing edges of a fuel tank 24 (Fig. 4) shown in Fig. 6 mounted in the wing of an aircraft. Four containers 21 are suitably mounted respectively one at each top corner of the tank, the two gauze sheets 10, 11 being respectively connected by conductors 25, 26 to the opposite terminals of a battery 27 mounted in the fuselage 28. The containers 21 are connected in series in the circuit, and an extinguisher bottle 29 is connected in parallel. If the wall of the tank is penetrated by a bullet the latter on passing through the wrapping will close the circuit in the manner above described, resulting in the bursting of the containers 21 and the opening of the bottle 29 and the consequent scattering and liberation of the explosion suppressing and fire extinguishing substances contained therein.

Figure 7:
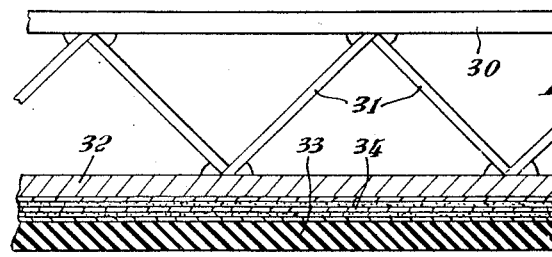
Figure 7 is a detail sectional view illustrating a fuel tank fitted with a detector according to the invention attached to the lower surface of an aircraft wing structure.

In the arrangement shown in Fig. 7 the reference numeral 30 denotes the skin of the wing of an aircraft to which is attached by means of lattice 31 the wall 32 of a metal tank inside which is disposed a rubber fuel tank 33. In such a construction a detector 34 according to the invention can be provided between the metal wall and the rubber wall, the precise form of detector shown in the figure being that illustrated in Figs. 1–3.

Fig. 9 illustrates a modified form of wrapping comprising two outer strips 35, 36 of metal gauze separated by an intermediate layer 37 of insulating material. In the drawing the conductor strips 35, 36 are connected in an electric circuit 38 in which 39 denotes the detonators of explosion suppressing or fire extinguishing apparatus such as the containers 21. In the event a bullet or other projectile passes through the wrapping the metal gauze sheets will be penetrated and the edges around the aperture thus made will be drawn outwards, as shown in dotted lines 40, in the direction of passage of the projectile and will be swaged together as previously described, resulting in the closing of the circuit.

A further modified form of detector is shown in Fig. 10. The detector in this figure comprises a mat or wrapping 41 made somewhat similarly to an electrically heated blanket except that the parallel elements of the resistance wiring 42 are sewn in more closely together, and at a distance less than the diameter of a bullet, say about ⅛" apart. This wiring is connected in an electrical circuit comprising a Wheatstone bridge so as to form one arm of the bridge, the other three arms comprising respectively resistors 44, 45, 46 to balance the network so that normally no current flows in a relay coil 47 connected across the bridge and constituting the detector arm thereof. The relay contact 48 is connected in a circuit 49 connected in parallel with the bridge and supplied by a battery 50 one or more containers such as 21 for fire and/or explosion suppressing and/or extinguishing substance being connected in the circuit 49. In the event that a bullet penetrates through the wrapping at least one of the wires of the wire mesh will be severed resulting in unbalancing the bridge, and operating the relay 48 to close the suppressor circuit 49.

Figure 11:
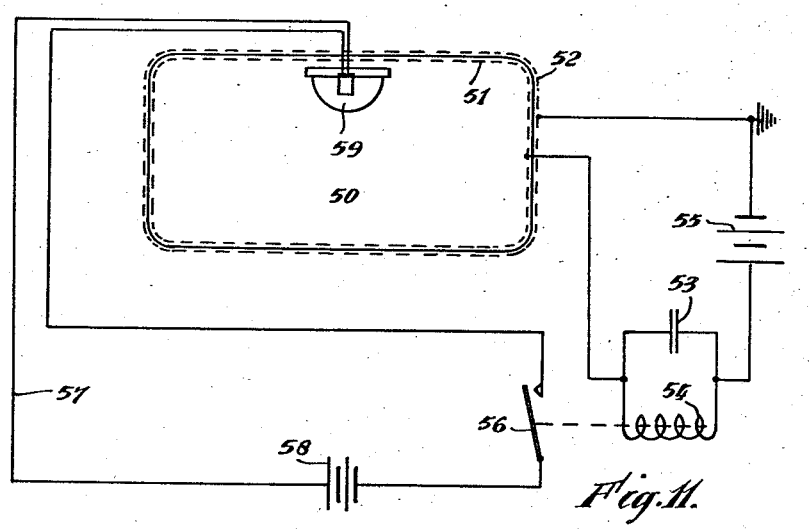

In the modified arrangement shown diagrammatically in Fig. 11 an enclosing structure such as a fuel tank 50 has its inner and outer surfaces coated or covered with an insulating material as by painting these surfaces with an insulating varnish. Inner and outer conducting strips or webs 51, 52, made for example of aluminium foil having a thickness, for example of considerably less than $\frac{1}{1000}$ of an inch are applied respectively to the inner and outer surfaces of the tank wall and are respectively connected to the terminals of a circuit comprising a capacitor 53 connected in parallel with a high speed relay winding 54, the circuit being supplied from a battery 55. The relay contact 56 is connected in a circuit 57 supplied by a battery 58, in which circuit is also connected the detonators of one or more containers 59 similar to the containers 21.

In the arrangement shown in Fig. 11 if a bullet, shell or the like were to pass through the wall of the tank, the bullet or the like would during its passage short circuit the two conductors 51, 52 for a small fraction of a second which is however long enough to produce a current impulse in the relay winding 54 and close the relay contact 56 to operate the detonators of the containers 59.

Figure 12:
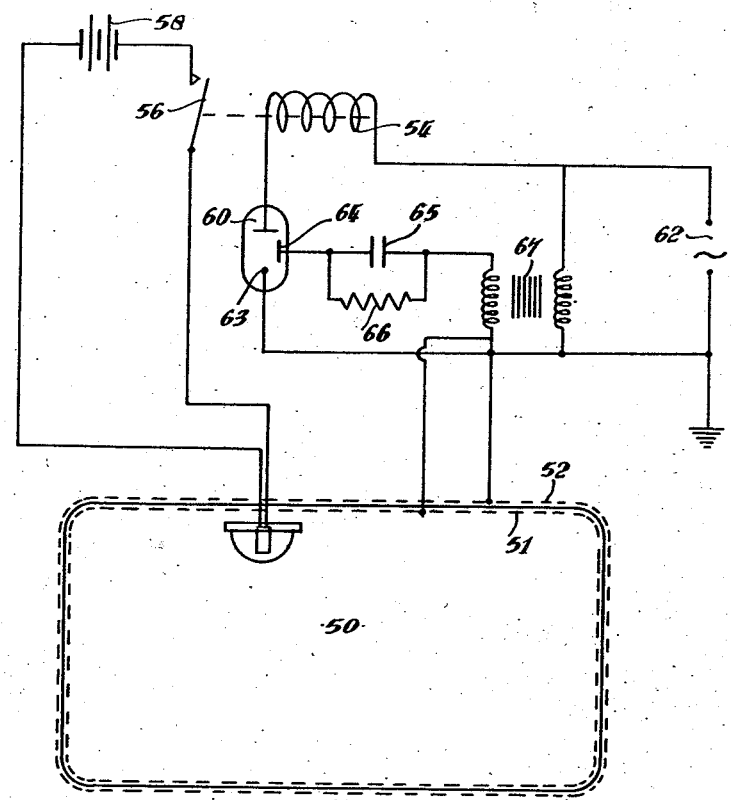

The operating circuit of Fig. 11 may be varied for greater sensitivity, for example as shown in Fig. 12, in which parts corresponding to parts shown in Fig. 11 are denoted by similar reference numerals. As shown in Fig. 12 the high speed relay winding 54 is connected in the anode circuit of a hot or cold cathode electronic valve 60 supplied from an alternating or other electric current source 62, the cathode 63 being connected to the conductor strip 52 whilst a control electrode 64 is coupled by a capacitor 65 in parallel with a resistor 66 to a transformer 67 and to the conductor strip 51.

The valve 60 is thus normally non-conductive but in the event that the conductors 51, 52 are closed by the passage of a bullet therethrough the circuit of the control electrode 64 will be closed thus making the valve conductive, whereby a current pulse will pass through the relay winding 54 and operate the relay contact 56.

In Figs. 11 and 12 the conductor strips 51 and 52 may be in the form of a wrapping to be laid or fixed on the inner or outer surface of the tank. It may comprise five layers similar to the arrangement shown in Fig. 3, and in a preferred arrangement the three insulating layers comprise a thin tough linen fabric impregnated with phenol varnish or other insulating liquid, whilst the two conducting strips comprise aluminium foil having a thickness substantially less than 1/1000 of an inch, these foil layers being virtually embedded in the linen fabric.

It will be readily understood that a detector made according to the invention can, as above described, be used for purposes other than the detection of incipient fire and/or of fire extinction or suppression of explosions.

What we claim and desire to secure by Letters Patent is:

1. A device for protecting a fuel tank against an explosion resulting from the penetration of a wall of said tank by a projectile or the like, comprising two readily tearable electrically conductive members of extensive surface area, a thin sheet of electrically insulating material, said readily tearable electrically conductive members being bonded to opposite sides of said thin sheet of insulating material, the bonded conductive members and sheet of insulating material being mounted adjacent the tank wall, said sheet being readily torn by passage of a projectile or the like whereby permanent electrical contact is established between said two electrically conductive members, a source of electric current, a frangible container of explosion suppressing material mounted within said tank, and an electrically operated detonator fitted within said container for bursting said container and scattering its contents upon electrical operation of the detonator, said detonator being connected electrically in series with said current source between said two conductive members, whereby electrical contact between said conductive members operates said detonator.

2. A device for detecting damage to the wall of a space enclosing structure resulting from the passage of a projectile or the like thereupon to effect the release of explosion suppressing material within said space, comprising a thin readily-tearable sheet of electrically insulating material, a first electrically conductive member of mesh form bonded to one side of said sheet, a second electrically conductive member of mesh form bonded to the opposite side of said sheet, a surce of electric current, and a frangible container of explosion suppressing material mounted within said space, said container having an electrically ignitable explosive charge for rupturing said container and explosively distributing the suppressing material, said current source being electrically connected in series with said electrically ignitable charge between said first and second electrically conductive members, whereby permanent electrical contact between said first and second conductive members resulting from passage of a projectile or the like through said readily-tearable sheet automatically effects distribution of explosion suppressing material within said space.

3. A device for protecting a fuel tank against an explosion resulting from the penetration of a wall of said tank by a metallic projectile, comprising two electrically conductive members of mesh form mounted adjacent the tank wall and spaced apart by electrically insulating material, said material and said conductive members being tearable by passage of a projectile whereby electrical contact is established between said conductive members at least temporarily during the passage of said projectile, a first source of electric current, a high speed electromagnetic relay having an energising winding, a capacitor, said capacitor being electrically connected in parallel with said energising winding, said first current source being electrically connected in series with the parallel-connected energising winding and capacitor between said two conductive members whereby charging current flows through said capacitor and energizing current flows through said energizing winding when said two conductive members make contact, the charge stored in said capacitor being discharged through said energising winding when contact between said two conductive members ceases, a pair of electrical contacts, said contacts being closed upon energisation of said relay, a further current source, a frangible container of explosion suppressing material mounted within said tank, and an electrically operated detonator fitted within said container for bursting said container and scattering its contents upon electrical operation of the detonator, said detonator being connected electrically in series with said further current source and said pair of electrical contacts.

4. A device according to claim 1, comprising three thin sheets of electrically insulating material, said two readily tearable electrically conductive members being interleaved between said three thin sheets of insulating material and bonded thereto, whereby said conductive members are insulated from one another and are also provided with an outer insulating covering.

5. A device for protecting a fuel tank against an explosion resulting from the penetration of a wall of said tank by a projectile or the like, comprising two readily tearable electrically conductive members of extensive surface area, a thin sheet of electrically insulating material, said readily tearable electrically conductive members being bonded to opposite sides of said thin sheet of insulating material, the bonded conductive members and sheet of insulating material being mounted adjacent the tank wall, said sheet being readily torn by passage of a projectile or the like whereby permanent electrical contact is established between said two electrically conductive members, an electronic valve, said valve having an anode, a cathode and a conduction control electrode, a source of electric current, said anode and said cathode being electrically connected to opposite poles of said current source, a source of conduction initiating voltage, said cathode being electrically connected to one of said readily tearable conductive members and said control electrode being connected to the other of said readily tearable conductive members through said source of conduction initiating voltage whereby contact between said two conductive members initiates conduction of current through said valve from said electric current source, a frangible container of explosion suppressing material mounted within said tank, and an electrically operated detonator fitted within said container for bursting said container and scattering its contents upon electrical operation of the detonator, said detonator being connected electrically in a circuit through which detonator igniting current flows when said valve is rendered conductive.

6. A device for protecting a fuel tank against an explosion resulting from the penetration of a wall of said tank by a metallic projectile, comprising a frangible electrical conductor mounted adjacent the fuel tank and extending over a substantial area with successive portions of the conductor closely spaced to one another whereby the passage of a projectile through said area will sever said conductor at some position along its length, a source of electric current, an electrical relay, electric contacts closed by operation of said relay, said conductor being connected in circuit with said relay and said current source for normally maintaining said relay non-operative whereby severing of said conductor results in operation of said relay, a frangible container of explosion suppressing material mounted within said tank, and an electrically operated explosive charge fitted within said container for bursting said container and scattering its contents upon electrical operation of the detonator, said detonator being connected electrically in series with said contacts and said current source whereby closure of said contacts operates said detonator.

7. A device for protecting a fuel tank against an explosion resulting from the penetration of a wall of said tank by a metallic projectile, comprising a frangible electrical conductor mounted adjacent the fuel tank and extending over a substantial area with successive portions of the conductor closely spaced to one another whereby the passage of a projectile through said area will sever said conductor at some position along its length, a Wheatstone bridge circuit, one arm of said bridge circuit including said electrical conductor, a source of electric current connected to one pair of diagonally opposite corners of said bridge circuit, an electrical relay connected to the other pair of diagonally opposite corners of said bridge circuit, electric contacts closable upon energisation of said relay, said bridge circuit being balanced whereby negligible current flows through said relay until said conductor is severed whereupon substantial current flows through said relay due to the bridge circuit becoming unbalanced, a frangible container of explosion suppressing material mounted within said tank, and an electrically operated explosive charge fitted within said container for bursting said container and scattering its contents upon electrical operation of the detonator, said detonator being connected electrically in series with said contacts and said current source whereby closure of said contacts operates said detonator.

8. A device for protecting a fuel tank against an explosion resulting from the penetration of a wall of said tank by a metallic projectile, comprising a frangible electric resistance wire extending over a substantial area adjacent said wall with adjacently disposed parts of said resistance so closely spaced together that at least one part will be severed by a projectile penetrating said wall, a Wheatstone bridge circuit, one arm of said bridge circuit including said resistance wire, a source of electric current connected to one pair of diagonally opposite corners of said bridge circuit, an electrical relay connected to the other pair of diagonally opposite corners of said bridge circuit, electric contacts closable upon energisation of said relay, said bridge circuit being balanced whereby negligible current flows through said relay until said resistance wire is severed whereupon substantial current flows through said relay due to the bridge circuit becoming unbalanced, a frangible container of explosion suppressing material mounted within said tank, and an electrically operated explosive charge fitted within said container for bursting said container and scattering its contents upon electrical operation of the detonator, said detonator being connected electrically in series with said contacts and said current source whereby closure of said contacts operates said detonator.

References Cited in the file of this patent

UNITED STATES PATENTS

| | | |
|---|---|---|
| 2,427,901 | Clark | Sept. 23, 1947 |
| 2,585,039 | Rooke | Feb. 12, 1952 |
| 2,635,225 | Hadady | Apr. 14, 1953 |
| 2,647,730 | Teague | Aug. 4, 1953 |
| 2,693,240 | Glendinning et al. | Nov. 2, 1954 |